United States Patent [19]

Roy et al.

[11] Patent Number: 5,194,557
[45] Date of Patent: Mar. 16, 1993

[54] POLYORGANOOXOTHIAZENES AND METHOD FOR PREPARING SAME

[75] Inventors: Aroop K. Roy; Gary T. Burns, both of Midland, Mich.

[73] Assignee: Dow Corning Corporation, Midland, Mich.

[21] Appl. No.: 644,761

[22] Filed: Jan. 23, 1991

[51] Int. Cl.$^5$ ............................................. C08G 77/22
[52] U.S. Cl. ...................................... 528/30; 564/101; 528/25; 528/391
[58] Field of Search .................. 564/101; 528/391, 30, 528/25

[56] References Cited

U.S. PATENT DOCUMENTS 3,017,240  1/1962  Cramer ................................. 23/14
5,068,379  11/1991 Roy ..................................... 556/422

OTHER PUBLICATIONS

Bechtold et al., in the Journal of Fluorine Chemistry vol. 19, p. 379 (1982).
Levchenko et al., Zh., Obsch. Khim, 32, 2585, 1962.
Carl Johnson Journal of Organic Chemistry, 44, 13 (2055-2061) Jun. 22, 1979.
Zh. Org. Khim., 3, 1481 (1967), J. Org. Chem. (USSR) 3, 1439 (1967) 1234, Levchenko et al.

*Primary Examiner*—Melvyn I. Marquis
*Attorney, Agent, or Firm*—Robert Spector

[57] ABSTRACT

This invention provides polyorganooxothiazenes exhibiting levels of molecular weight and properties not heretofore achieved by similar polymers reported in the prior art. The sulfonimidates that are condensed to form the polymers are prepared using a novel reaction between an N-triorganosilylsulfonamide and a triorganodihalophosphorane to form the corresponding N-triorganosilylsulfonimidoyl halide that is subsequently reacted with a fluorinated alcohol or phenol to form the N-triorgano-silylsulfonimidate.

12 Claims, No Drawings

POLYORGANOOXOTHIAZENES AND METHOD FOR PREPARING SAME

BACKGROUND OF THE INVENTION

1. Field of the Invention

This invention relates to polymers containing an inorganic backbone structure including sulfur atoms. More particularly, this invention relates to homopolymers and copolymers containing alternating sulfur (VI) and nitrogen atoms as the repeating units and a method for preparing these polymers.

This invention also relates to a method for preparing these polymers using 1) compounds of hexavalent sulfur, specifically the corresponding N-triorganosilylsulfonamide or N,N-bis(triorganosilyl)sulfonamide, 2) a dichloro- or dibromotriorganophosphorane and 3) a phenol or fluorinated alcohol as reactants.

2. Description of the Prior Art

The polymers referred to in this specification as polyorganooxothiazenes contain repeating units of the general formula

(1)

Polyoxothiazenes containing a fluorine atom or an amino group as the substituent represented by Y in formula 1 are reported in U.S. Pat. No. 3,017,420, which issued to Cramer on Jan. 16, 1962. A disadvantage of these polymers is their poor hydrolytic stability and their susceptibility to degradation in the presence of nucleophilic reactants. In addition, the susceptibility to thermally induced degradation of these polymers would be expected to be inferior to that of polymers containing a hydrocarbon radical as the substituent represented by Y.

The preparation of oxothiazene telomers that could contain up to ten repeating units per molecule and trifluoromethyl as the substituent represented by Y in formula 1 is reported by Bechtold et al in the Journal of Fluorine Chemistry [Vol. 19, page 379 (1982)]. The telomers were prepared from the sulfinyl azide $CF_3S(O)N_3$, a compound of tetravalent sulfur. Because of their tendency to decompose azido compounds as a class are difficult to synthesize, store and manipulate.

An article by Levchenko et al. [Zh. Obsch. Khim. 32, 2585 (1962) reports a polyorganooxothiazene containing a phenyl radical as the substituent represented by Y in formula 1. This polymer is characterized only by a softening temperature of from 80° to 100° C. The polymer is prepared by heating the phenyl ester of areneiminosulfonic acids of the general formula ArS-(O)(=NH)OC$_6$H$_5$ where Ar represents a phenyl radical.

Carl Johnson in the Journal of Organic Chemistry, 44, 13 (2055-2061), published on Jun. 22, 1979, reports obtaining a polymer from the reaction of a sulfonimidoyl chloride corresponding to the formula PhSX(O)=NH, where Ph represents a phenyl radical and X is chlorine with pyridine, methylamine or dimethylamine. The hydrocarbon radical represented by R is aryl. The article does not describe the isolation of the polymers nor does it provide any structural or other characterization data for these polymers.

The polyorganooxothiazenes reported by Bechtold, Levchenko et al. and Johnson were prepared using compounds of tetravalent sulfur as starting materials. These starting materials suffer from one or more of the following disadvantages: difficult to synthesize and/or purify, not readily accessible or available, malodorous, and limited shelf life due to decomposition during long-term storage. In addition, some of the reactants used to convert the sulfur in these compounds from the tetravalent to the desired hexavalent state suffer from the same disadvantages as the compounds they are intended to convert. Moreover, some of these reactants are high energy compounds, and potentially explosive.

By contrast, the sulfonic acids and derivatives of these acids, such as the chlorides, anhydrides and sulfonamides, are generally very stable, readily available, and can be handled in large quantities without exercising more than the ordinary precautions involved in handling acidic and corrosive materials.

One objective of this invention is to provide a class of polyorganooxothiazenes wherein the hydrocarbon radical bonded to sulfur is other than the aromatic radicals disclosed in the aforementioned article by Levchenko et al.

A second objective of this invention is to provide a method for preparing high molecular weight polyorganooxothiazenes using derivatives of organic sulfonic acids as reactants. In accordance with the method discovered by the present inventors, the N-triorganosilyl organosulfonimidates that are thermally condensed to form the present polymers are, in turn, prepared by reacting an N-trimethylsilyl organosulfonamide or an N,N-bis(triorganosilyl)alkanesulfonamide of the formula

Where $R^{1*}$ represents a monovalent hydrocarbon or substituted hydrocarbon radical, $R^2$ represents a monovalent hydrocarbon or halogenated hydrocarbon radical and p is 1 or 2, with a triorganodihalophosphorane followed by reaction of the resultant sulfonimidoyl halide, $R^2{}_3SiN=S(O)R^{1*}X$, where X represents chlorine or bromine, with a phenol or a fluorinated monohydric alcohol. This route to sulfonimidoyl halides has not been reported in the literature.

SUMMARY OF THE INVENTION

This invention provides polyorganooxothiazenes exhibiting levels of molecular weight and properties not heretofore achieved by similar polymers reported in the prior art. The sulfonimidates that are condensed to form the polymers are prepared using a novel series of reactions from an amide, chloride or anhydride of an organosulfonic acid.

DETAILED DESCRIPTION OF THE INVENTION

This invention provides organooxothiazene polymers containing repeating units corresponding to the general formula

where $R^1$ of each repeating unit is individually selected from the group consisting of monovalent unsubstituted and substituted hydrocarbon radicals exclusive of unsubstituted aromatic hydrocarbon radicals wherein a cyclic carbon atom of said aromatic hydrocarbon radicals is bonded to sulfur, and heterocyclic radicals where the hetero atom is oxygen, sulfur or tertiary nitrogen, and said polymers contain an average of at least 25 of said units per molecule.

This invention also provides a method for preparing polyorganooxothiazenes, said method comprising the following series of steps:

(1) reacting an N-triorganosilylsulfonamide corresponding to the formula $R^{1*}SO_2N(H)_n(SiR^2{}_3)_{(2-n)}$ with a triorganodihalophosphorane corresponding to the formula $R^3{}_3PX_2$, to yield a organosulfonimidoyl halide represented by the formula $R^2{}_3SiN=S(O)(R^{1*})X$, where $R^{1*}$ and $R^2$ are individually selected from the group consisting of monovalent hydrocarbon radicals and monovalent substituted hydrocarbon radicals, n is 0 or 1, $R^3$ represents an aryl radical and X is chlorine or bromine;

(2) reacting said organosulfonimidoyl halide with a compound of the formula $R^4OH$ in the presence of an acid acceptor to form an N-triorganosilyl organosulfonimidate corresponding to the formula $R^2{}_3SiN=S(O)(R^{1*})OR^4$, where $R^4$ represents an aryl or fluorinated alkyl radical and (3) heating at least one organosulfonimidate to form the corresponding polyorganooxothiazene.

The N-triorganosilyl sulfonamide is, in turn, prepared by reacting a hexavalent sulfur compound selected from the group consisting of organosulfonyl chlorides represented by the formula $R^{1*}SO_2Cl$ and organosulfonic anhydrides of the formula $(R^{1*}SO_2)_2O$ with a hexaorganodisilazane of the formula $(R^2{}_3Si)_2NH$ N,N-bis(triorganosilyl)sulfonamides can also be prepared by reacting an organosulfonamide of the formula $R^{1*}SO_2NH_2$ with the combination of a triorganohalosilane of the formula $R^2{}_3SiCl$ and an acid acceptor.

The conversion of the sulfonimidate to a polyorganooxothiazene is preferably conducted in the presence of certain metallic or non-metallic Lewis acids or bases or complexes of these compounds. Preferred catalysts include but are not limited to halides of boron, aluminum, manganese and iron, tin (II) carboxylates, potassium fluoride and lithium phenoxide.

The present method for converting a N-triorganosilylorganosulfonamide to the corresponding N-triorganosilylorganosulfonimidoyl halide by reaction with a triorganodihalophosphorane is novel and constitutes part of the invention claimed in a copending application. The sulfonimidoyl halide is then reacted with a phenol or a fluorinated alcohol to form the corresponding sulfonimidate that is condensed to form the present polymers.

The radical represented by $R^{1*}$ in the formulae for the present polymers and intermediates is a monovalent hydrocarbon radical or a substituted hydrocarbon radical. In the definition for the novel polymers of this invention, the carbon atom of $R^1$ that is bonded to sulfur cannot be part of an unsubstituted benzene ring or other unsubstituted aromatic ring structure such as a naphthyl radical due to a disclosure of this class of polymers in the article by Levchenko et al. discussed in a previous section of this specification.

When $R^{1*}$ represents a substituted hydrocarbon radical, the only limitation on the substituent is that it not interfere with the synthesis of the present polymers by inhibiting the reaction with any of the intermediates used to prepare the present polymers or by reacting with these intermediates. Substituents which are precluded by this definition include those with labile hydrogen atoms, including hydroxyl, amino, mercapto and carboxyl. Enolizable substituents such as hydrocarbonyl $[RC(O)-]$ should also be avoided.

Suitable substituents for $R^1$ and $R^{1*}$ include but are not limited to alkoxy, aryloxy, nitro, dihydrocarbylamino, halogen, carboalkoxy and triorganosilyl. Alternatively, $R^1$ and $R^{1*}$ an represent a saturated or unsaturated heterocyclic ring structure wherein the hetero atom is oxygen, sulfur or tertiary nitrogen. Representative ring systems include but are not limited to thiophene, pyridine and furan, with the sulfur atom of the polymer backbone being bonded to a cyclic carbon atom. In another embodiment, $R^1$ and $R^{1*}$ can represent a heterocyclic ring structure that is separated from the sulfur atom on the polymer backbone by one or more carbon atoms.

The hydrocarbon radicals represented $R^1$ and $R^{1*}$ typically contain from 1 to about 20 carbon atoms.

The reactants and the sequence of reactions used to prepare the various intermediates for the sulfonimidate precursor of the present polyorganooxothiazenes will now be discussed in detail.

Preparation of the N-Mono- and N,N-Bis(triorganosilyl Sulfonamide)

In accordance with the first step of the present method a N-(triorganosilyl)sulfonamide (3) or N,N,bis(-triorganosilyl)sulfonamide (5) is prepared by reacting 1) the chloride (1), anhydride (2) or amide (4) of an organosulfonic acid containing the same organic group bonded to sulfur as desired in the final polyoxothiazene with 2) a anodisilazane or the combination of triorganochlorosilane with triethylamine or other suitable tertiary amine to react with the hydrogen chloride generated as a by-product of the reaction. This step of the process is depicted in the following equations 1, 2 and 3.

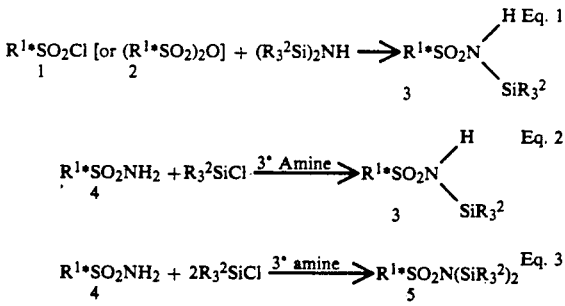

In the formulae of these equations $R^{1*}$ is defined in the preceding section of this specification and $R^2$ is a monovalent hydrocarbon or halogenated hydrocarbon radical.

$R^{1*}$ is preferably alkyl containing from 1 to 20 carbon atoms, halogenated alkyl, aryl, halogenated aryl, aralkyl or aralkenyl. Particularly preferred embodiments of $R^{1*}$ included but are not limited to methyl, ethyl, 3-chloropropyl, phenyl, p-fluorophenyl and beta-styryl (PhCH=CH- where Ph is Phenyl). $R^2$ is preferably alkyl containing from 1 to 4 carbon atoms, based on the availability of the intermediates used to prepare these organosilicon compounds.

The monosilylsulfonamide (3) is converted to the corresponding sulfonimidoyl halide (7) by reacting it with a triorganodihalophosphorane, $R^3{}_3PX_2$ (6) in the presence of a tertiary amine as an acid acceptor as shown in equation 4. The corresponding disilylsulfonamide (5) is converted to sulfonimidoyl halide (7) by reaction with the phosphorane (6) as shown in equation 5. No base is required. In place of the base an additional equivalent of alcohol and base are used in the next step of the present method to convert the chlorosilane generated as a by-product of the reaction to the more inert alkoxysilane.

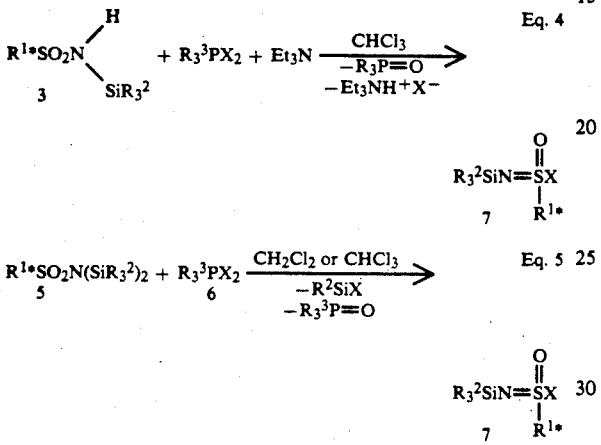

The triorganodichlorophosphorane can be prepared as shown in equation 6 by reacting a triorganophosphine, $R^3{}_3P$, with hexachloroethane, $C_2Cl_6$, or with elemental bromine to yield the corresponding dibromophosphorane. The present inventors have discovered that to ensure a complete reaction the mixture of phosphine and hexachloroethane should be heated for at least 4 hours.

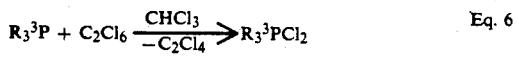

The preparation of sulfonimidoyl halides by reaction of a sulfonamide with a triorganodihalophosphorane is not reported in the chemical or patent literature.

Reaction of the sulfonimidoyl halide (7) with a fluorinated alcohol or phenol $R^4OH$ in the presence of a tertiary amine or other acid acceptor converts it to the corresponding sulfonimidate (8). The reaction is depicted in equation 7, where $R^4$ represents a fluorinated alkyl or an aryl radical. It has been found that only fluorinated alcohols and phenols yield sulfonimidates that undergo a heat-induced condensation to the polyorganooxothiazenes of this invention.

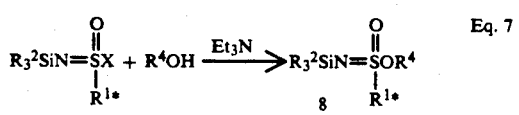

The thermally initiated condensation of the sulfonimidate to the polyoxothiazene is shown in equation 8. To achieve a high molecular weight polymer this condensation is preferably carried out in a sealed glass tube or other type of reactor capable of withstanding the pressure generated during the condensation reaction. The sulfonimidate is preferably degassed prior to sealing of the reactor.

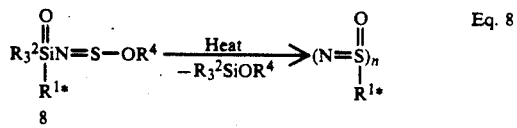

Sulfonimidates containing two or more different $R^{1*}$ substituents, (8aa) and (8ba), can be copolymerized, as shown in equation 9, where Ph represents a phenyl radical.

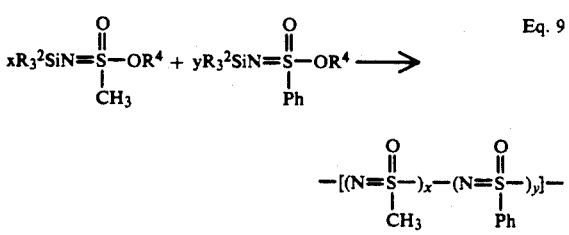

The repeating units in preferred copolymers contain $R^{1*}$ substituents that are alkyl or substituted alkyl, all of which contain from 1 to about 20 carbon atoms. Alternatively, a portion of the $R^{1*}$ substituents are phenyl or halogenated phenyl where the halogen is chlorine, bromine or fluorine. Copolymers wherein $R^1$ is methyl and either phenyl or p-fluorophenyl are particularly preferred.

The present polyorganooxothiazenes can be characterized using conventional analytical methods, including gel permeation chromatography, differential scanning calorimetry, thermogravimetric analysis and nuclear magnetic resonance.

Properties of Polyorganooxothiazenes

Depending upon the type of hydrocarbon or halogenated hydrocarbon radical bonded to the sulfur atom, the glass transition temperatures of the present homopolymers and copolymers range from about 55° to about 95° C. The degree of polymerization of the polymers is preferably from 100 to 10,000.

The present polymers are particularly useful as solvent-resistant molding and coating materials.

Specifically, the present inventors have found that polymers containing an alkyl radical such as methyl bonded to sulfur are soluble in water at temperatures above about 60° C. and insoluble in liquid aliphatic, aromatic and chlorinated hydrocarbons, ethers and nitriles.

Polymers containing an aromatic radical such as phenyl bonded to sulfur are insoluble in both hot and cold water and in liquid aliphatic hydrocarbons.

A variety of chemically reactive polymers can be prepared by replacing the hydrogen or halogen atoms on the substituent identified in the preceding formulae as $R^{1*}$ with reactive groups such as amino, hydroxyl and carboxyl.

EXAMPLES

The following examples describe the preparation and analysis of preferred polyorganooxothiazenes together with preferred methods for preparing these polymers and their intermediates, and should not be interpreted as limiting the scope of the invention defined in the accompanying claims either with respect to the polymers or their methods of preparation. Unless otherwise indicated all parts and percentages in the examples are by weight.

The parenthetical numbers identifying the intermediates in the examples refer to the numbers underneath the products and reactants in the foregoing equations.

Preparation of N,N-bis(trimethylsilyl) Merhanesulfonamide (5a)

A glass reactor equipped with a stirrer, nitrogen inlet, reflux condenser and addition funnel was purged with nitrogen and charged with 29.1 g (0.30 mol) of methanesulfonamide, $MeSO_2NH_2$, where Me represents the methyl radical, 84.9 ml (0.605 mol of triethylamine and 240 ml of dry benzene. Trimethylchlorosilane (129.5 ml, 1.00 mol) was then added through the addition funnel over a period of 15 minutes to the stirred mixture, followed by heating at the boiling point for three hours. The mixture was then diluted with 200 ml of hexane and stirring was continued for 30 minutes.

The solid salt which precipitated during the reaction was washed three times with a total of about 250 ml. of hexane and the washings were combined with the liquid portion of the reaction mixture. The solvents together with unreacted silane and amine were removed from this liquid by distillation using reduced pressure at a temperature of 45° to 55° C. The light brown liquid that remained was distilled twice using a 10 cm Vigreaux column to yield 36.9 g (51 % yield) of a colorless liquid that boiled between 100° and 106° C. under a pressure of 5.2 mm Hg.

The reaction product was found to contain 5% of the corresponding N-trimethylsilyl methanesulfonamide.

Preparation of N-trimethylsilyl Methanesulfonamide (3a, R=Me)

A glass reactor equipped with a water-cooled reflux condenser, a stirrer and a nitrogen inlet was purged with nitrogen and charged with hexamethyldisilazane (88.8 ml, 0.4123 mole), and methanesulfonyl chloride (32.2 ml, 0.4082 mole). The mixture was then heated to a temperature between 90° and 100° C. until initiation of the reaction. The mixture was then heated to between 115° and 120° C. for two hours to maintain refluxing of liquid, at which time it was allowed to cool to room temperature. The trimethylohlorosilane produced as a by-product of the reaction was then removed under reduced pressure.

The crude monosilylsulfonamide (3a), which was greater than 98 percent pure, was either used as such or purified by distillation. The $^1H$ nuclear magnetic resonance (NMR) spectrum of the crude product as a 20-25 percent solution in chloroform using a frequency of 90 MHz. exhibited the following shifts: 0.10 (s, 9H); 2.8 (s, 3H); 5.25 (s, 1H, NH).

Preparation of N-Trimethylsilyl Benzenesulfonamide (3b, R=Phenyl)

A glass reactor equipped with a reflux condenser, addition funnel and mechanically operated stirrer was purged with nitrogen and charged with benzenesulfonamide (48.12 g., 0.300 mol), triethylamine (44.6 ml, 0.315 mol) and 230 ml of benzene which had been previously freed from water. Chlorotrimethylsilane (38.8 ml, 0.300 mol) was added through the addition funnel to the mixture over 15-20 minutes. The addition funnel was then rinsed with 10 ml of benzene and the mixture heated at the boiling point for three hours.

After cooling to room temperature the mixture was filtered under nitrogen and the solid which had precipitated in the reactor was isolated, washed three times with benzene, and the washings combined with the liquid portion of the mixture. The liquid was then heated at 45°-55° C. under reduced pressure for a period of time sufficient to remove the solvent and excess amine. The residue, a semi-solid, was distilled under a pressure of 0.05 mm Hg. The amount of product obtained was equivalent to a 91% yield of the desired N-trimethylsilyl benzene sulfonamide (3b).

The $^1H$ NMR spectrum of the product (90 MHz, 20-25% in $CH_2Cl_2$) exhibited maxima at the following shift values: 0.18 (s, 9H); 5.25 (s, 1H, NH using chloroform as the solvent), 7.38-7.61 (m, 3H), 7.75-7.91 (m, 2H).

Preparation of N-Trimethylsilyl 4-Fluorobenzenesulfonamide (3c)

A glass reactor equipped with a stirrer, reflux condenser and gas inlet was charged with solid 4-fluorobenzenesulfonyl chloride 0.250 mol, 49.65 g). Hexamethyldisilazane (0.263 mol, 56.6 ml) was added to the reactor and the mixture was gradually heated with stirring to a temperature of 115° C., at which time it became clear. The mixture was then heated at the boiling point for 21 hours. Analysis of the mixture by $^1H$ NMR indicated that the reaction was about 50% complete. Volatile materials were then removed by heating at a temperature of 65° C. under reduced pressure to yield a brown liquid which was distilled to remove unreacted sulfonyl chloride. The residue was redistilled under a pressure of 0.03 mm. Hg. The fraction collected from 40° to 97° C. was analyzed by $^1H$ NMR and was found to contain the N-mono- and N,N-bis(trimethylsilyl)sulfonamides in a 1:1 molar ratio. Using the same analytical technique a second fraction collected within the range from 97° and 122° C. was found to contain the N-mono- and N,N-bis(trimethylsilyl)sulfonamides in a 8.5:1 molar ratio. The second fraction was used as the starting material (3c) for the subsequent reaction.

Preparation of N-Trimethylsilyl 2-Phenylethylenesulfonamide (3d)

A glass reactor equipped with a mechanically operated stirrer, reflux condenser and gas inlet was charged with 2-phenylethylenesulfonyl chloride (0.2464 mol, 53.6 ml) and hexamethyldisilazane (0.2488 mol, 53.6 ml), following which the contents of the reactor were heated. The generation of chlorotrimethylsilane became evident at a temperature of 107°-110° C., and the mixture was heated for one hour at a temperature of 115°-117° C. Volatile materials were removed by heating to a temperature of 45° to 55° C. under reduced pressure to yield a thick, reddish colored material. This material was distilled twice to yield 42.7 g of N-trimethylsilyl 2-phenylethylenesulfonamide. The product was collected at 155°-160° C. at a pressure of 0.05 mm. Hg. Analysis by $^1H$ NMR indicated that the product was 95% pure. The NMR spectrum obtained using a 20-25% solution of the product in acetonitrile and an RF of 90 MHz exhibited signals corresponding to the following chemical shifts: 0.33 (s, 9H), 5.50 (s, 1NH), 7.08 (d, 1H), and 7.40-7.80 (m, 6H),

Preparation of N-trimethylsilyl 3-Chloropropanesulfonamide (3e)

A glass reactor equipped with a stirrer, reflux condenser and gas inlet was charged with hexamethyldisilazane (0.4235 mol, 91.2 ml) and 3-chloropropanesulfonyl chloride (0.4193 mol, 75.0 g). The contents of the reactor were heated. A refluxing liquid was first observed at a temperature of 85°–95° C., and the mixture became clear. The mixture became cloudy at a temperature of about 105 degrees. The temperature of the mixture was maintained at 120° C. for 90 minutes and at 145°–150° C. for 15 minutes. The mixture was then allowed to cool to room temperature, at which time it was filtered, the solids were washed with benzene, and the washing liquid combined with the liquid portion of the mixture. The combined liquids were then heated at 60°–65° C. under reduced pressure to remove volatile materials and then distilled. The fraction boiling from 127°–129° C. under a pressure of from 0.04–0.07 mm. Hg was collected, and was equivalent to a 72.5 % yield based on initial reactants. The $^1$H NMR spectrum was consistent with the expected product.

Preparation of N-Trimethylsilyl Ethanesulfonamide (3f)

This product was prepared following the general procedure described for the corresponding 3-chloropropanesulfonamide using ethanesulfonamide as the reactant. The initial mixture was heated at 125°–130° C. for two hours. The product was isolated in the same manner and distilled from 94° to 96° C. under a pressure of 0.65 mm. Hg. The yield was 37%.

General Procedure for Preparation of N-Trimethylsilylalkane- and N-Trimethylsilylarenesulfonimidoyl Chlorides (7) from the Corresponding N-Trimethylsilylsulfonamides A glass reactor equipped with a stirrer, addition funnel and gas inlet was purged with nitrogen and charged with hexachloroethane as a 1 to 2 molar solution in dry chloroform. A solution of triphenylphosphine as a 1 to 2 molar solution in dry chloroform was added to the reactor with stirring over 5 min. while the reactor was cooled to 0° C. The mixture was heated at the boiling point for 4.5 hr and then cooled to 0° C. Triethylamine was then added to the reactor over 5 minutes at a temperature of 0° C. followed by the addition of a 4 to 7 molar solution of a monosilylsulfonamide in dry chloroform over a 10–15 minute period while the reactor was cooled to −78° C. The contents of the reactor were then allowed to warm to 0° C. during which time the mixture became virtually clear. This was interpreted as indicative of the formation of a sulfonimidoyl chloride. The presence of the sulfonimidoyl chloride was inferred from the $^1$H NMR spectrum of the mixture. In some instances this analysis was performed when a clear mixture was first observed.

Because the sulfonimidoyl chlorides are not stable for extended periods above 0° C., they were not isolated. Instead, they were allowed to react immediately with phenol or trifluoroethanol in the presence of triethylamine to form the corresponding sulfonimidates.

N-Trimethylsilylmethanesulfonimidoyl Chloride (7a)

The reactants used in the general procedure were hexachloroethane (0.315 mol, 76.09 g), triphenylphosphine (0.3165 mol, 83 85 g), triethylamine (0.315 mol, 44.6 ml , and N-trimethylsilyl sulfonamide (3a) (0.315 mol, 52.6 g). The $^1$H NMR spectrum (90 MHz, CHCl$_3$ as the solvent exhibited signals at the following shift values: 0.13 (s, 9H) and 3.45 (s, 3H)

N-trimethylsilylbenzenesulfonimidoyl Chloride (7b)

The reactants used in the general procedure were hexachloroethane (0.1353 mol, 32.68 g), triphenylphosphine (0.1367 mol, 36.22 g), triethylamine (0.1353 mol, 19.2 ml), and N-trimethylsilylsulfonamide (3b) (0.1353 mol, 31.0 g).

N-trimethylsilyl-4-fluorobenzenesulfonimidoyl Chloride (7c)

The reactants used in the general procedure were hexachloroethane (0.0953 mol, 23.02 g), triphenylphosphine (0.0963 mol, 25.51 g), triethylamine (0.0991 mol, 12.5 ml), and a mixture of N-mono- and N,N-bis(trimethylsilyl sulfonamides (3c) and (5c) containing about 89.5% monosilylsulfonamide (3c) (0.0881 mol, 21.76 g).

N-trimethylsilyl-2-phenylethylenesulfonimidoyl Chloride (N-trimethylsilyl-β-styrenesulfonimidoyl Chloride) (7d)

The reactants used in the foregoing general procedure were hexachloroethane (0.1667 mol, 40.27 g), triphenylphosphine (0.1683 mol, 44.59 g), triethylamine (0.1667 mol, 23.6 ml), and the N-trimethylsilyl sulfonamide 3d (0.1667 mol, 42.50 g).

N-trimethylsilyl-3-chloropropanesulfonimidoyl Chloride (7e)

The reactants used in the foregoing general procedure were hexachloroethane (0.0902 mol, 21.79 g), triphenylphosphine (0.0911 mol, 24.14 g), triethylamine (0.0902 mol, 12.8 mL), N-trimethylsilyl sulfonamide (3e) (0.0902 mol, 20.66 g). The identity of the reaction product was confirmed by the presence of signals at the following shifts in the $^1$H NMR spectrum: 90 MHz (CHCl$_3$) 0.05 (s, 9H), 2.12 (m, 2H, SCH$_2$CH$_2$), 3.38 (t, 2H, SCH$_2$), 3.45 (t, 2H, ClCH$_2$).

N-trimethylsilylethanesulfonimidoyl Chloride (7f)

Hexachloroethane (0.1110 mol, 26.81 g), triphenylphosphine (0.1121 mol, 29.70 g), triethylamine (0.1110 mol, 15.7 mL), monosilylsulfonamide (3f) (0.1110 mol, 20.1 g). 1H NMR signals (90 MHz, CHCl$_3$): 0.00 (s, 9H), 1.27 (t, 3H), 3.23 (q, 2H).

General Procedure for the Synthesis of N-trimethylsilylalkane- and N-Trimethylsilyl Arenesulfonimidates (8) from the Corresponding Sulfonimidoyl Chlorides (7).

A mixture of the appropriate alcohol (2,2,2-trifluoroethanol or phenol and an amount of triethylamine based on 98% yield of sulfonimidoyl chloride dissolved in an amount of dry benzene sufficient to form a 3 to 5 molar solution of the amine or alcohol was added over a 15 to 30 minute period with stirring to a glass reactor containing the sulfonimidoyl chloride dissolved in chloroform from the previous reaction. The reactor was maintained at a temperature of 0° C. during the addition. Following completion of the addition the mixture was stirred at 0°–5° C. for 60–120 minutes then diluted with a quantity of isomeric hexanes equivalent to 20–40% of the volume of chloroform present in the mixture and the mixture stirred for about 16 hours at room temperature.

About 70 to 80 percent of the solvents and other volatile materials were then removed under reduced pressure at a temperature of from 40° to 45° C. A quantity of isomeric hexanes sufficient to either provide smooth stirring of the three equivalents of solid by-products or sufficient to form a 0.5-1.0 molar solution of the sulfonimidate, based on theoretical yield, were added. The mixture was stirred for 30-60 minutes, filtered under nitrogen and the solids washed three or four times with hexanes. The washings were combined with the initial filtrate, which was then concentrated at a temperature of 45° to 55° C. under reduced pressure. This usually resulted in the precipitation of additional solid material. Isomeric hexanes was again added, the mixture stirred 15-30 minutes, filtered under nitrogen, and the solids again washed two or three times with hexanes. Solvents were removed from the combined filtrate and washings at a temperature of from 45° to 55° C. under reduced pressure to yield the crude N-trimethylsilyl sulfonimidate.

The crude sulfonimidate was purified by distillation under reduced pressure from one to three times to yield the pure N-trimethylsilyl sulfonimidate.

2,2,2-Trifluoroethyl-N-trimethylsilyl Methanesulfonimidate (8aa)

The reactants used in the general procedure were sulfonimidoyl chloride (7a, triethylamine (0.3089 mol, 43.8 ml) and 2,2,2-trifluoroethanol (0.3087 mol, 22.5 ml). The boiling range of the sulfonimidate was 77°-78° C./7.7 mm Hg and the yield was 73%.

$^1$H NMR signals (90 MHz, $C_6H_6$) 0.30 (s,9H), 2.40 (s,3H), 3.97 (m, 2H, diastereotopic $OCH_2CF_3$ protons). Elemental Analysis: Calc. C, 29.14; H, 5.66; N, 5.62; S, 12.86. Found C, 29.01; H, 5.47; N, 5.65; S, 12.96.

Phenyl-N-trimethylsilyl Methanesulfonimidate (8ab)

The reactants used in the general procedure were sulfonimidoyl chloride (7a), triethylamine (0.4657 mol, 66.0 ml) and phenol (0.4655 mol, 43.81 g). Boiling range of the product: 73°-78° C./0.03 mm. Yield 53% after three distillations. 1H NMR signals (90 MHz, $C_2Cl_2$) 0.05 (s ,9H), 3.05 (s, 3H), and 7.08-7.51 (m, 5H).

2,2,2-trifluoroethyl-N-trimethylsilyl Benzenesulfonimidate (8ba)

The reactants used in the general procedure were sulfonimidoyl chloride (7b), triethylamine (0.1377 mol, 19.5 ml), 2,2,2-trifluoroethanol (0.1375 mol, 10.0 ml). Boiling range of product: 84°-86° C./0.7 mm. Yield: 27%. $^1$H NMR signals (90 MHz, $CH_3CN$): 0.27 (s, 9H), 4.35 (q, 2H, multiplet in benzene), 7.63-7.83 (m,3H), 7.93-8.13 (m, 2H).

Phenyl-N-trimethylsilyl Benzenesulfonimidate (8bb)

The reactants used in the general procedure were sulfonimidoyl chloride (7b), triethylamine (0.1328 mol, 18.8 ml), phenol (0.1326 mol, 12.48 g). Boiling range: 110°-121° C./0.05 mm. Yield: 21% $^1$H NMR signals (90 MHz, $CH_2Cl_2$): 0.21 (s, 9H), 6.78-7.01, 7.11-7.38 (m, 5H), 7.41-765 (m, 3H), 7.78-8.01 (m, 2H).

Phenyl-N-trimethylsilyl-4-fluorobenzenesulfonimidate (8cb)

The reactants used in the general procedure were sulfonimidoyl chloride (7c), triethylamine (0.0936 mol, 13.3 ml), phenol (0.0934 mol, 8.79 g). Boiling range of product: 125°-131° C./0.25 mm. Yield: 15%. $^1$H NMR signals (90 MHz, $CH_3CN$): 0.24 (s, 9H), 6.83-7.57 (m, 7H), and 7.83-8.1 (m, 2H).

2,2,2-trifluoroethyl N-trimethylsilyl-2-phenylethylenesulfonimidate (8da)

The reactants used in the general procedure were sulfonimidoyl chloride (7d), triethylamine (0.1634 mol, 23.2 ml), 2,2,2-trifluoroethanol 0.1633 mol, 11.9 ml). Boiling range of product: 105°-108° C./0.04 mm; Yield: 45%; $^1$H NMR signals (90 MHz, $CH_3CN$): 0.3 (s, 9H), 4.47 (q, 2H, multiplet in benzene), 7.02 (d, 1H), 7.40-7.87 (m, 6H).

Elemental Analysis: Calc. C, 46.27; H, 5.38; N, 4.15; S, 9.50. Found C, 46.80; H, 5.42; N, 4.23; S, 10.51.

Phenyl-N-trimethylsilyl 2-Phenylethylenesulfonimidate (8db)

The reactants used in the general procedure were sulfonimidoyl chloride (7d), triethylamine (0.0853 mol, 12.1 ml), phenol (0.0852 mol, 8.02 g). The $^1$H NMR spectrum of the crude clearly indicated the formation of the desired sulfonimidate in about 55% yield. The product was found to be unstable to distillation, possibly condensing to form a polymer below its boiling point. A similar effect was observed using sulfonimidate 8eb as described below.

2,2,2-trifluoroethyl-N-trimethylsilyl 3-Chloropropanesulfonimidate (8ea)

The reactants used in the general procedure were sulfonimidoyl chloride 7e, triethylamine (0.1444 mol, 20.5 ml), 2,2,2-trifluoroethanol (0.1443 mol, 10.5 ml). Boiling Point: 85°-87° C./1.0 mm. Yield: 67%. $^1$H NMR (90 MHz $C_6H_6$); 0.28 (s, 9H), 1.77-2.14 (m, 2H, $SCH_2CH_2$), 2.86 (t, 2H, $SCH_2$), 3.17 (t, 2H, $ClCH_2$), 4.04 (m, 2H, $OCH_2CF_3$).

Phenyl-N-trimethylsilyl 3-Chloropropanesulfonimidate (8eb)

The reactants used in the general procedure were sulfonimidoyl chloride 7e, triethylamine (0.0884 mol, 12.5 ml), phenol (0.0883 mol, 8.30 g). $^1$H NMR of the crude clearly indicated the formation of the desired sulfonimidate in ca. 66% yield, but the product was found unstable to distillation, rapidly condensing (with the generation of $Me_3SiOPh$) to the corresponding oxothiazene polymer at a temperature of about 100° C. under a pressure of 0.025 mm Hg. $^1$H NMR signals (90 MHz, $CH_2Cl_2$) for the crude sulfonimidate: 0.03 (s, 9H), 2.08-2.58 (m, 2H, $SCH_2CH_2$), 3.35 (t, 2H, $SCH_2$), 3.68 (t, 2H, $ClCH_2$), ca. 7.08-7.48 (m, 5H, $OC_6H_5$) $^1$H NMR signals (90 MHz, $CH_2Cl_2$) for the crude polymer: 2.07-2.67 (broad hump, 2H, $SCH_2CH_2$), 3.27-3.97 (broad hump, 4H, $SCH_2$, $ClCH_2$).

Phenyl-N-trimethylsilyl Ethanesulfonimidate (8fb)

The reactants used in the general procedure were sulfonimidoyl chloride 7f, triethylamine, (0.1089 mol, 15.4 ml), and phenol 0.1087 mol, 10.23 ml)

Boiling range of product: 71°-73° C. at 10.8 mm Hg Yield = 24%

$^1$H NMR signals (90 MHz, $CH_2Cl_2$): 0.01 (s, 9H), 1.38 t, 3H), 3.15 (q, 2H), and 7.06-7.53 (m, 5H)

General Procedure for Preparation of Poly(methyloxothiazene) by the Thermal Condensation of Sulfonimidates The sulfonimidate was placed in a pre-weighed, heavy-walled glass ampule using a pipette. The ampule contents were then degassed using a vacuum line by standard freeze-thaw techniques. This procedure was repeated for a total of three times.

When a solid polymerization catalyst was used the catalyst was transferred into the ampule under a nitrogen atmosphere prior to addition of the sulfonimidate. Liquid catalysts were placed in the ampule using a hypodermic syringe following addition of the sulfonimidate and prior to freezing of the contents of the ampule. In all instances the concentration of catalyst was 0.05 mole percent, based on monomer.

When 2,2,2-trifluoroethyl(N-trimethylsilyl)methanesulfonimidate was used as the monomer, evacuation of the ampule was performed at room temperature under a pressure of 10 mm Hg prior to degassing under full vacuum using the freeze-thaw technique.

The ampule was then sealed with the contents frozen and laced in a metal pipe equipped with screw caps. The pipe was then placed in a thermostatically regulated oven maintained at 120° C. for the time period specified in Table 1.

At the end of this period, the pipe was allowed to cool to room temperature. The ampule was taken out, cooled in liquid nitrogen and then opened. The liquid remaining in the ampule was analyzed using $^1$H NMR to determine the amount of monomer that had reacted.

The crude solid polymer in the ampule was washed three times with methylene chloride and then dried under reduced pressure. The polymer was then dissolved in 4 ml of N,N-dimethylformamide and precipitated by dropwise addition of the resultant solution to an excess of toluene. The precipitated polymer was washed first with toluene then with isomeric hexanes and finally dried in a vacuum oven for 24–48 hours at 80°–84° C. The typical product was a flaky or fibrous vanilla-colored solid.

The molecular weight of the solid material was determined in DMF (as 0.5% solution) at 90° C. using u-Styragel(R) columns having pore sizes of $10^3$, $10^4$, and $10^5$ angstroms and polystyrene standards with a refractive index detector. The values for the weight average molecular weight (Mw), the number average molecular weight (Mn) and Mw/Mn are recorded in Table 1, together with the identification of the sulfonimidate used as the monomer. Some of the polymers were analyzed using thermogravimetric analysis under a helium atmosphere and a temperature increase rate of 10° C./minute. The temperature at which a 10% weight loss, based on initial polymer weight, was observed is recorded in Table 1 under the heading "TGA Temp.".

TABLE 1

| Monomer | Catalyst[8] | Time (Hrs.) | % Yield | Mw | Mn | Mw/Mn | TGA Temp. |
|---|---|---|---|---|---|---|---|
| 8ab | AlCl$_3$ | 100 | 69 | 284,907 | 13,770 | 20.7 | ND |
| 8ab | AlCl$_3$ | 144 | 82 | 192,607 | 9,424 | 20.4 | 258 |
| 8ab | BF$_3$.Et$_2$O[1] | 144 | 62 | 478,816 | 52,526 | 9.1 | 272 |
| 8ab | KF/Crown[2] | 144 | 83 | 175,461 | 23,079 | 7.6 | ND |
| 8ab | LiOPh[3] | 144 | 46 | 286,443 | 17,998 | 15.9 | 276 |
| 8ab | TASF[4] | 144 | 58 | 374,937 | 33,246 | 11.3 | ND |
| 8ab | None | 144 | 39 | 481,123 | 34,535 | 12.9 | ND |
| 8ab | Sn(oct)$_2$[5] | 144 | 69 | 427,664 | 30,325 | 14.1 | ND |
| 8ab | WCl$_6$ | 144 | 97 | 196,815 | 7,403 | 26.6 | ND |
| 8bb[6] | None | 144 | 32 | 194,614 | 138,116 | 1.4 | ND |
|  |  |  |  | 14,110 | 12,242 | 1.2 | ND |
| 8bb[7] | KF/Crown[2] | 144 | 46–50 | 66,261 | 17,484 | 3.8 | ND |

Notes
[1] Boron trifluoride etherate
[2] A mixture of potassium fluoride and 18-crown-6 ether in a 1:1 mole ratio
[3] Ph = Phenyl
[4] TASF = Tris(dimethylamino)trimethylsilyl sulfur difluoride
[5] Stannous octoate
[6] The molecular weight distribution was distinctly bimodal and was analyzed as two peaks.
[7] The molecular weight distribution was bimodal and analyzed as a single peak.
[8] The catalyst concentration for all polymerizations was 0.05 mole percent, based on monomer.

Synthesis of Poly(Methyl-co-Phenyloxothiazene) Iab

Copolymer Iab was prepared under the same conditions described for homopolymers Ia and Ib. The two precursors 8aa and 8ba were heated together in a sealed ampoule and the polymer obtained after condensation had proceeded to about 76% of completion was purified once from N,N-dimethylformamide (solvent)/water (non-solvent) and once from CH$_2$Cl$_2$ (solvent /hexane (non-solvent).

Analysis by GPC revealed Mw=17,785 and Mn=2,380. The polymer exhibited a Tg at 71° C. by differential scanning calorimetry (DSC) and a 10% weight loss at 279° C. under helium by thermogravimetric analysis (TGA). Proton NMR analysis showed a molar ratio of methyl to phenyl radicals of about 1:1.2.

Synthesis of Poly(4-fluorophenyloxothiazene) From Sulfonimidate 8cb

The polymerization of the sulfonimidate was conducted as described in the general procedure using no catalyst and a heating period of 243 hours. The weight of the silyl ether produced as a by-product of the polymerization indicated a 52% conversion of the sulfonimidate. The crude polymer was washed several times with a mixture of isomeric hexanes and then dried under reduced pressure for two hours. The polymer was then dissolved in 4–5 ml of N,N-dimethylformamide and precipitated into an excess of cold distilled water. The recovered polymer was then washed first with water followed by a washing with a 1:1 weight ratio mixture of 2-propanol and water and finally dried under reduced pressure at a temperature of 85° C. for 22 hours.

The glass transition temperature of the polymer, determined using differential scanning calorimetry, was 86° to 87° C. The polymer exhibited a 10% weight loss, measured using thermogravimetric analysis under helium with a heating rate of 10° C. per minute to a final temperature of 285° C. The polymer had a bimodal molecular weight distribution (Fraction 1: $M_w=539,000$, DP=3433, polydispersity=1.4; Fraction 2: $M_w=42,700$, DP=272 and polydispersity=1.2).

That which is claimed is:

1. An organooxothiazene polymer consisting essentially of repeating units of the general formula

where $R^1$ of each repeating unit is individually selected from the group consisting of monovalent unsubstituted and substituted hydrocarbon radicals exclusive of unsubstituted aromatic hydrocarbon radicals wherein a cyclic carbon atom, of said aromatic hydrocarbon radicals is bonded to sulfur atom of said formula, and heterocyclic radicals where the hetero atom is oxygen, sulfur or tertiary nitrogen, and where said polymer contains an average of at least 25 of said units per molecule.

2. An organooxothiazene polymer according to claim 1 where $R^1$ is selected from the group consisting of alkyl, substituted aryl or aralkenyl radicals and said organooxothiazene contains an average of from 100 to 10,000 repeating units per molecule.

3. An organooxothiazene polymer according to claim 2 where said alkyl radicals contain from one to twenty carbon atoms, said substituted aryl radicals are chlorinated, brominated or fluorinated.

4. A polyorganooxothiazene according to claim 3 where at least two different types of repeating units are present.

5. A polyorganooxothiazene according to claim 4 where a portion of the hydrocarbon radicals represented by $R^1$ are fluorinated aryl or aralkenyl and the remainder are alkyl.

6. A polyorganooxothiazene according to claim 5 where said alkyl radical contains from 1 to 4 carbon atoms and said aralkenyl radical is beta-styryl.

7. A method for preparing a polyorganooxothiazene, said method comprising the sequential steps of (1) reacting a N-triorganosilyl sulfonamide corresponding to the formula $R^{1*}SO_2N(H)_n(SiR^2_3)_{(2-n)}$ where $R^{1*}$ and $R^2$ are individually selected from the group consisting of monovalent hydrocarbon, monovalent substituted hydrocarbon radicals and heterocyclic radicals wherein the hetero atom is oxygen, sulfur or tertiary nitrogen, and n is 0 or 1, with a triorganodihalophosphorane corresponding to the formula $R^3_3PX_2$, where $R^3$ represents an aryl radical and X is chlorine or bromine, to yield an organosulfonimidoyl halide represented by the formula $R^2_3SiN=S(O)(R^{1*})X$, with the proviso that the reaction is carried out in the presence of a tertiary amine as an acid acceptor when n is 1;

(2) reacting said organosulfonimidoyl halide with a compound of the formula $R^4OH$ to form an organosulfonimidate corresponding to the formula $R^2_3SiN=S(O)(R^{1*})OR^4$, where $R^4$ represents an aryl or fluorinated alkyl radical, and (3) heating said organosulfonimidate to form the corresponding polyorganooxothiazene.

8. A method according to claim 7 where $R^{1*}$ represents alkyl, halogenated alkyl, aryl, halogenated aryl or aralkenyl, $R^2$ represents an alkyl radical containing from 1 to 4 carbon atoms, $R^3$ represents a phenyl radical, $R^4$ is phenyl or 2,2,2-trifluoroethyl, and n is 1.

9. A method according to claim 8 where $R^{1*}$ is selected from the group consisting of alkyl containing from one to twenty carbon atoms, phenyl, chlorinated phenyl, brominated phenyl, fluorinated phenyl and beta-styryl, $R^2$ represents alkyl containing from 1 to 4 carbon atoms, $R^3$ represents phenyl, X represents chlorine, and $R^4$ represents 2,2,2-trifluoroethyl or phenyl.

10. A method according to claim 7 where two sulfonimidates are heated to form a copolymer.

11. A method according to claim 10 where $R^{1*}$ of one sulfonimidate is methyl and $R^{1*}$ of the second sulfonimidate is either phenyl, p-fluorophenyl or beta-styryl.

12. A method according to claim 7 where the heating of said sulfonimidate is conducted in the presence of a catalyst selected from the group consisting of Lewis acids and Lewis bases.

* * * * *